United States Patent
Parr et al.

(10) Patent No.: US 11,839,319 B1
(45) Date of Patent: *Dec. 12, 2023

(54) SECURE PARCEL DELIVERY RECEPTACLE

(71) Applicants: Michael Parr, Riverside, CA (US);
Sara Parr, Riverside, CA (US)

(72) Inventors: Michael Parr, Riverside, CA (US);
Sara Parr, Riverside, CA (US)

(*) Notice: Subject to any disclaimer, the term of this patent is extended or adjusted under 35 U.S.C. 154(b) by 206 days.

This patent is subject to a terminal disclaimer.

(21) Appl. No.: 17/218,832

(22) Filed: Mar. 31, 2021

Related U.S. Application Data

(63) Continuation-in-part of application No. 16/267,536, filed on Feb. 5, 2019, now Pat. No. 11,103,096.

(51) Int. Cl.
*A47G 29/22* (2006.01)
*A47G 29/14* (2006.01)
*A47G 29/30* (2006.01)
*A47G 29/28* (2006.01)

(52) U.S. Cl.
CPC .......... *A47G 29/22* (2013.01); *A47G 29/141* (2013.01); *A47G 29/28* (2013.01); *A47G 29/30* (2013.01); *A47G 2029/145* (2013.01); *A47G 2029/149* (2013.01)

(58) Field of Classification Search
CPC .............. A47G 29/1225; A47G 29/124; A47G 29/141; A47G 29/22; A47G 29/28; A47G 29/30; A47G 2029/1257; A47G 2029/1226; A47G 2029/145; A47G 2029/148; A47G 2029/149; H04W 4/80; G06K 7/10297; G06K 19/06028; G07C 9/00912; G06Q 10/0832; G06Q 10/0836; E05B 65/0075

USPC ..... 232/17, 19, 34–36, 45; 340/569; 200/61, 200/63; 705/332, 339
See application file for complete search history.

(56) References Cited

U.S. PATENT DOCUMENTS

| | | | |
|---|---|---|---|
| 5,979,750 A * | 11/1999 | Kindell | A47G 29/141 232/1 R |
| D445,234 S | 7/2001 | Isaacs | |
| 6,987,452 B2 | 1/2006 | Yang | |
| 7,815,112 B2 | 10/2010 | Volpe | |
| 9,211,025 B1 * | 12/2015 | Elhawwashy | A47G 29/20 |
| 10,413,106 B1 * | 9/2019 | Valeriano | A47G 29/141 |
| 10,512,351 B1 * | 12/2019 | Valeriano | E05B 47/0001 |
| 10,743,693 B2 * | 8/2020 | Newcomb | E06B 7/32 |
| 10,881,233 B1 * | 1/2021 | Walsh | E06B 7/32 |
| 10,954,068 B2 * | 3/2021 | Nevison | G05B 15/02 |
| 11,346,150 B1 * | 5/2022 | Johnston | E06B 7/32 |
| 11,369,223 B2 * | 6/2022 | Plummer | A47G 29/141 |

(Continued)

FOREIGN PATENT DOCUMENTS

EP 3371788 9/2018

*Primary Examiner* — William L Miller
(74) *Attorney, Agent, or Firm* — Kyle A. Fletcher, Esq.

(57) ABSTRACT

The secure parcel delivery receptacle comprises a parcel receptacle, a locking cover, a scanner, and a camera. The parcel receptacle may accept a parcel for delivery. Access to the parcel receptacle may be via the locking cover which may be unlocked by the scanner. The camera may record one or more images as proof of delivery. The parcel receptacle may be a container into which the parcel may be placed. The parcel receptacle may have an access aperture through which the interior of the parcel receptacle may be accessed from the exterior of the parcel receptacle. In embodiments, the parcel receptacle may be a bag or a box.

15 Claims, 8 Drawing Sheets

(56) References Cited

U.S. PATENT DOCUMENTS

| | | | | |
|---|---|---|---|---|
| 11,534,015 | B2* | 12/2022 | Janas | A47G 29/141 |
| 11,536,079 | B2* | 12/2022 | Schler | E05F 15/77 |
| 2002/0035857 | A1* | 3/2002 | Stein | A47G 29/141 |
| | | | | 70/277 |
| 2002/0070269 | A1* | 6/2002 | Rosiello | A47G 29/12 |
| | | | | 232/19 |
| 2002/0087375 | A1* | 7/2002 | Griffin | G06Q 10/0835 |
| | | | | 705/336 |
| 2016/0140496 | A1* | 5/2016 | Simms | G08G 5/0069 |
| | | | | 705/337 |
| 2017/0124510 | A1 | 5/2017 | Caterino | |
| 2017/0251856 | A1 | 9/2017 | Schaible | |
| 2017/0286905 | A1* | 10/2017 | Richardson | G06Q 10/0832 |
| 2017/0352122 | A1* | 12/2017 | Markarian | B07C 5/28 |
| 2018/0070753 | A1* | 3/2018 | Eveloff | H04W 4/025 |
| 2018/0260777 | A1 | 9/2018 | Judge | |
| 2018/0261030 | A1 | 9/2018 | Arellano | |
| 2020/0005238 | A1* | 1/2020 | Richardson | G06Q 10/0836 |
| 2020/0035051 | A1* | 1/2020 | Kane | G07C 9/28 |
| 2020/0071991 | A1* | 3/2020 | Patel | E06B 7/34 |
| 2020/0121088 | A1* | 4/2020 | Chasnis, II | A47C 7/72 |
| 2020/0372441 | A1* | 11/2020 | Ruffkess | G06Q 10/0833 |
| 2021/0005033 | A1* | 1/2021 | Roman | G06Q 10/0833 |
| 2021/0059456 | A1* | 3/2021 | Fontanilla | A47G 29/16 |
| 2022/0058575 | A1* | 2/2022 | Moudy | H04L 67/125 |

* cited by examiner

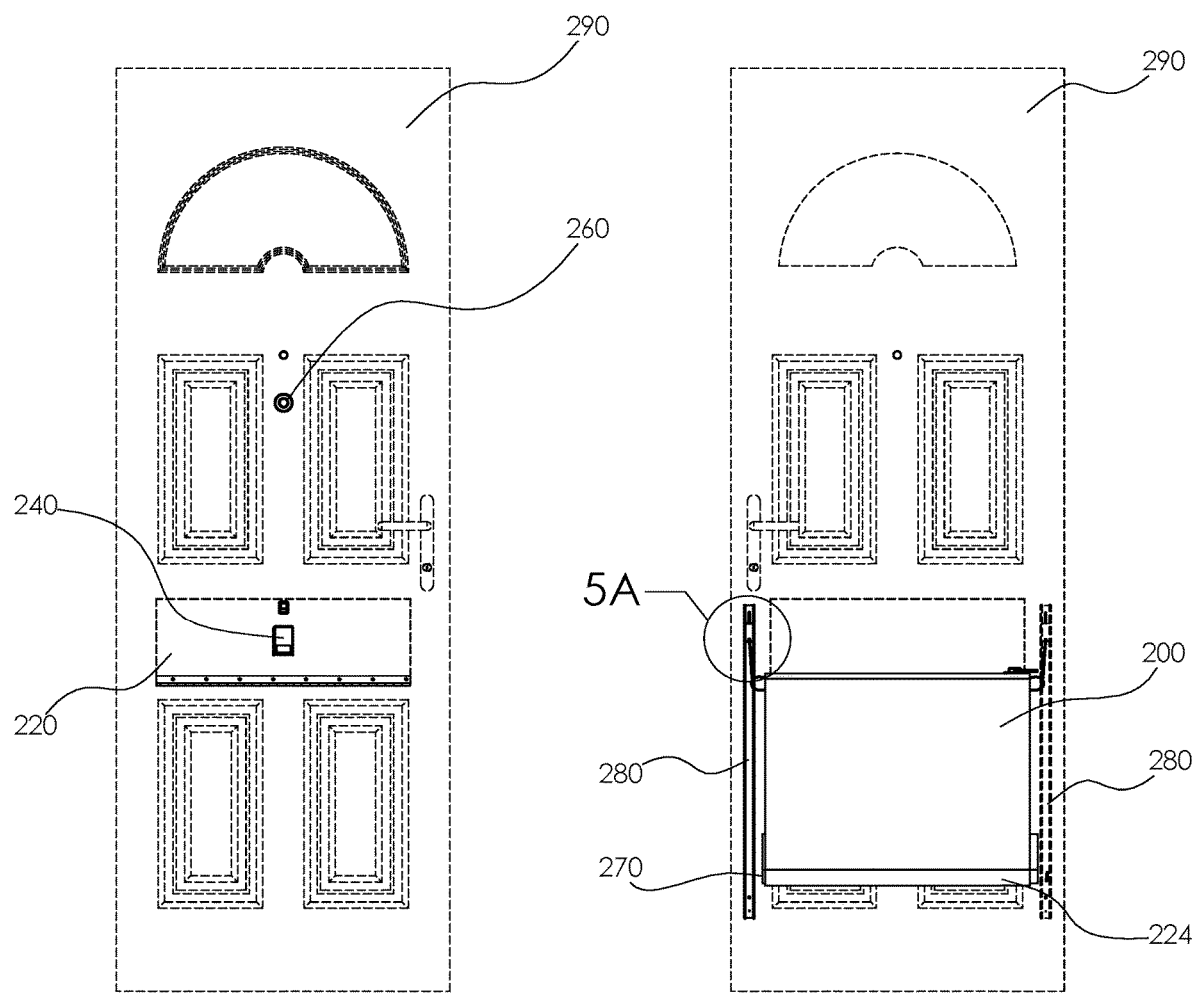
FIG. 4
FIG. 5
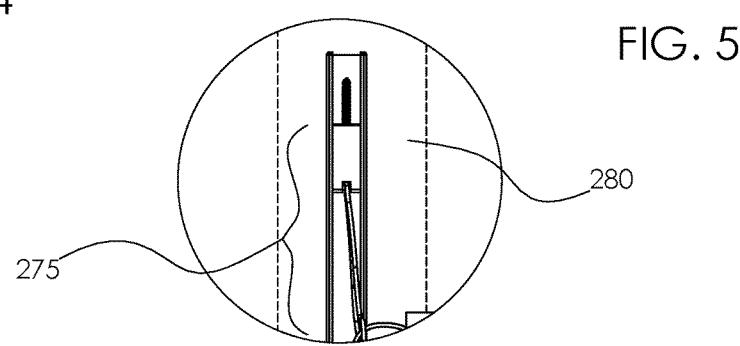
FIG. 5A

US 11,839,319 B1

SECURE PARCEL DELIVERY RECEPTACLE

CROSS REFERENCES TO RELATED APPLICATIONS

This application is a continuation-in-part of U.S. application Ser. No. 16/267,536, filed Feb. 5, 2019.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of parcel delivery, more specifically, a secure parcel delivery receptacle.

SUMMARY OF INVENTION

The secure parcel delivery receptacle comprises a parcel receptacle, a locking cover, a scanner, and a camera. The parcel receptacle may accept a parcel for delivery. Access to the parcel receptacle may be via the locking cover which may be unlocked by the scanner. The camera may record one or more images as proof of delivery. The parcel receptacle may be a container into which the parcel may be placed. The parcel receptacle may have an access aperture through which the interior of the parcel receptacle may be accessed from the exterior of the parcel receptacle. In embodiments, the parcel receptacle may be a bag or a box.

An object of the invention is to accept a parcel delivery into a secure receptacle.

Another object of the invention is to unlock a locking cover of the secure receptacle using a one-time code obtained from the parcel.

A further object of the invention is to record one or more images of an attempt to access the secure receptacle.

Yet another object of the invention is to transmit a status message regarding an attempt to access the secure receptacle.

These together with additional objects, features and advantages of the secure parcel delivery receptacle will be readily apparent to those of ordinary skill in the art upon reading the following detailed description of the presently preferred, but nonetheless illustrative, embodiments when taken in conjunction with the accompanying drawings.

In this respect, before explaining the current embodiments of the secure parcel delivery receptacle in detail, it is to be understood that the secure parcel delivery receptacle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the secure parcel delivery receptacle.

It is therefore important that the claims be regarded as including such equivalent construction insofar as they do not depart from the spirit and scope of the secure parcel delivery receptacle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a front view of an embodiment of the disclosure.

FIG. 5 is a rear view of an embodiment of the disclosure.

FIG. 5A is a detail view of an embodiment of the disclosure illustrating the area designated 5A in FIG. 5.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figures 1, 2:
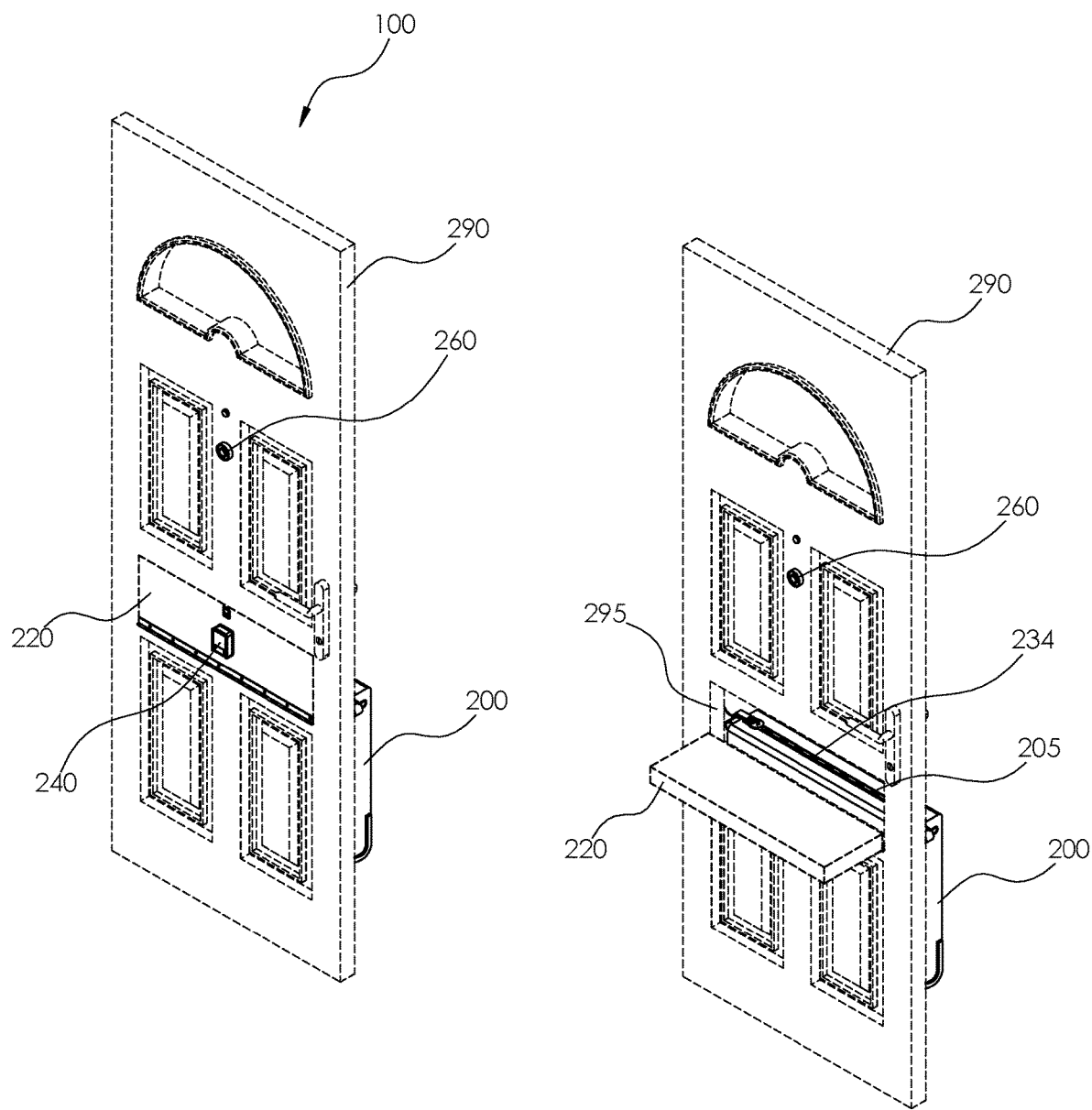
FIG. 1 is an isometric view of an embodiment of the disclosure illustrating the locking cover in the closed position.
FIG. 2 is an isometric view of an embodiment of the disclosure illustrating the locking cover in the open position.
Figure 3:
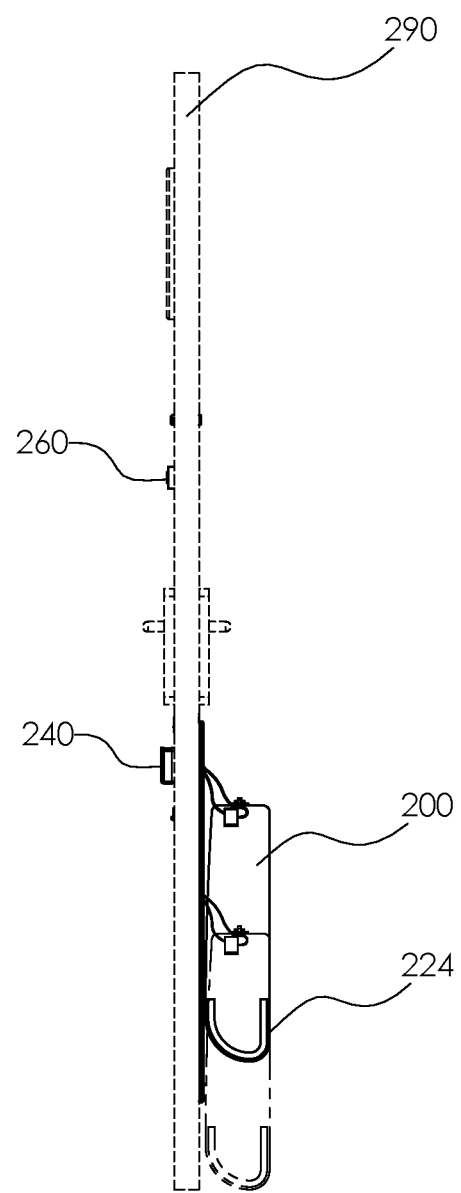
FIG. 3 is a side view of an embodiment of the disclosure.
Figure 6:
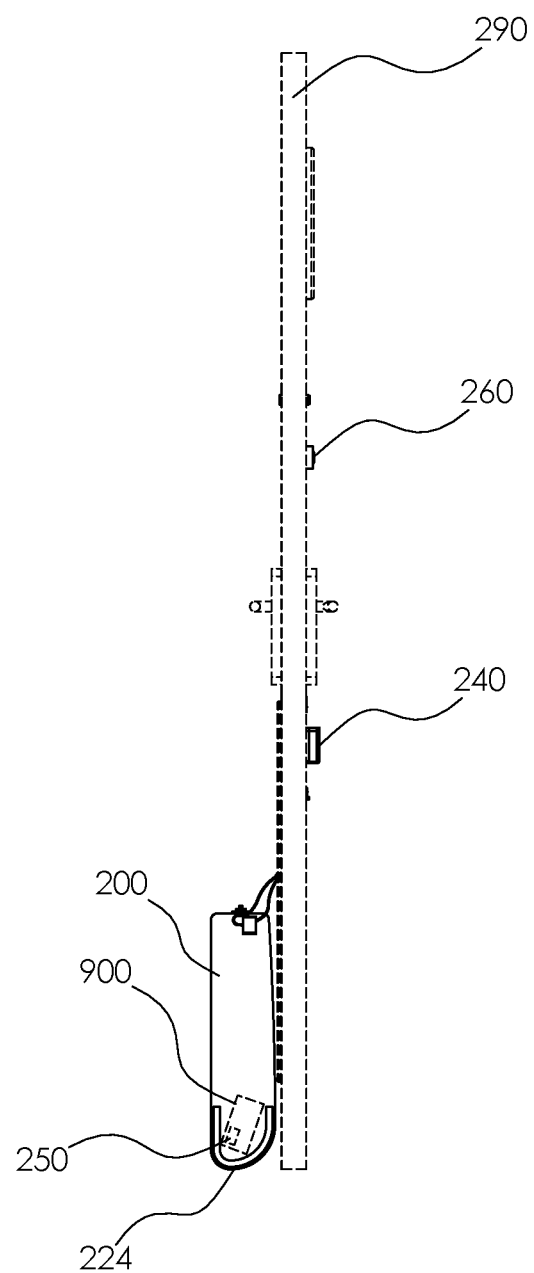
FIG. 6 is a side view of an embodiment of the disclosure illustrating the receptacle in use.
Figure 7:
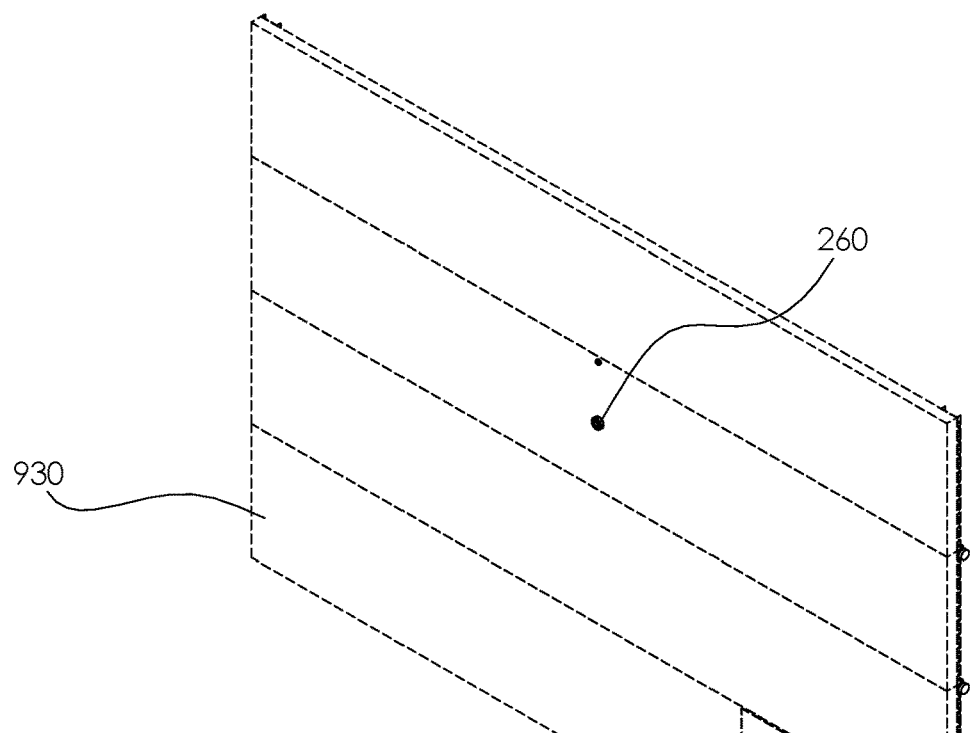
FIG. 7 is an isometric view of a second embodiment of the disclosure illustrating the locking cover in the closed position.
Figure 8:
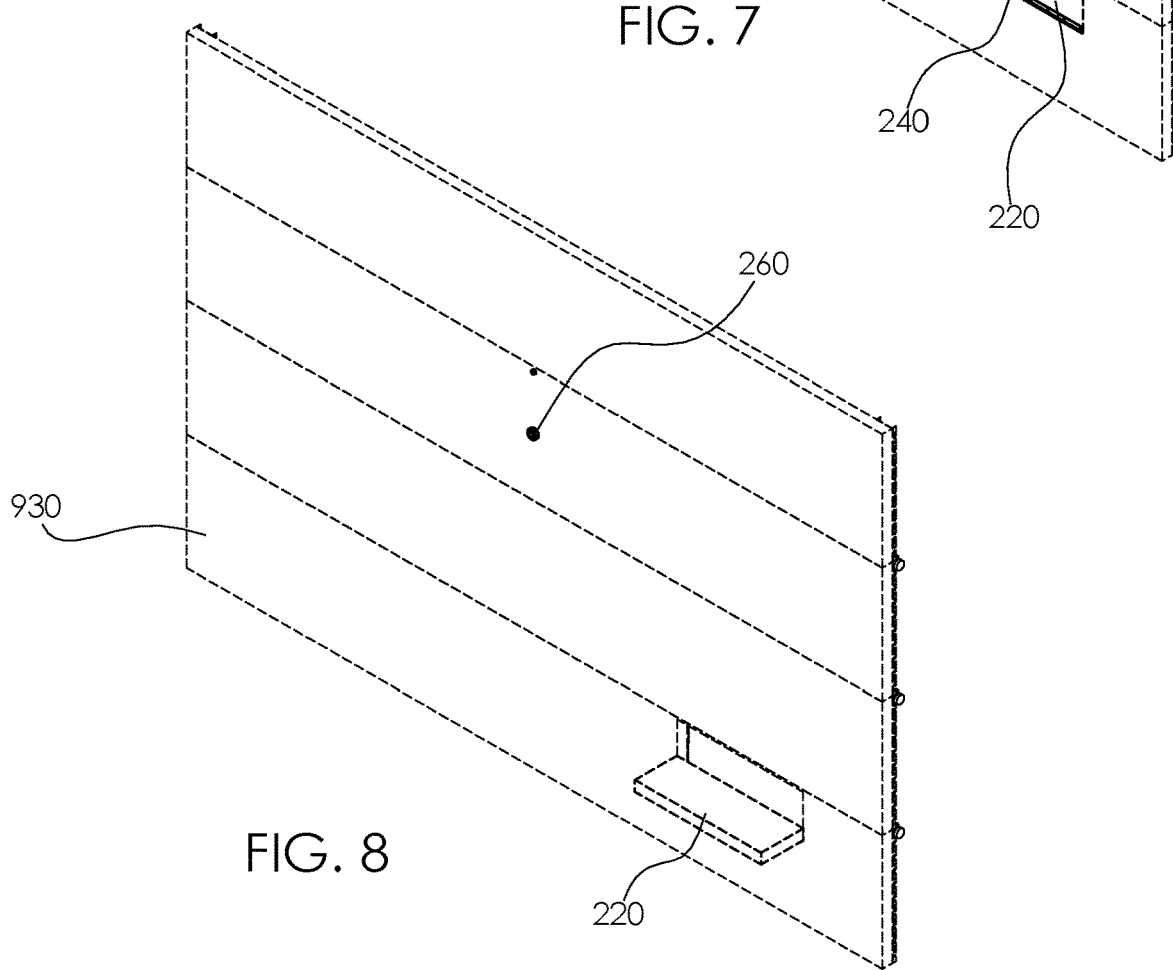
FIG. 8 is an isometric view of a second embodiment of the disclosure illustrating the locking cover in the open position.
Figure 9:
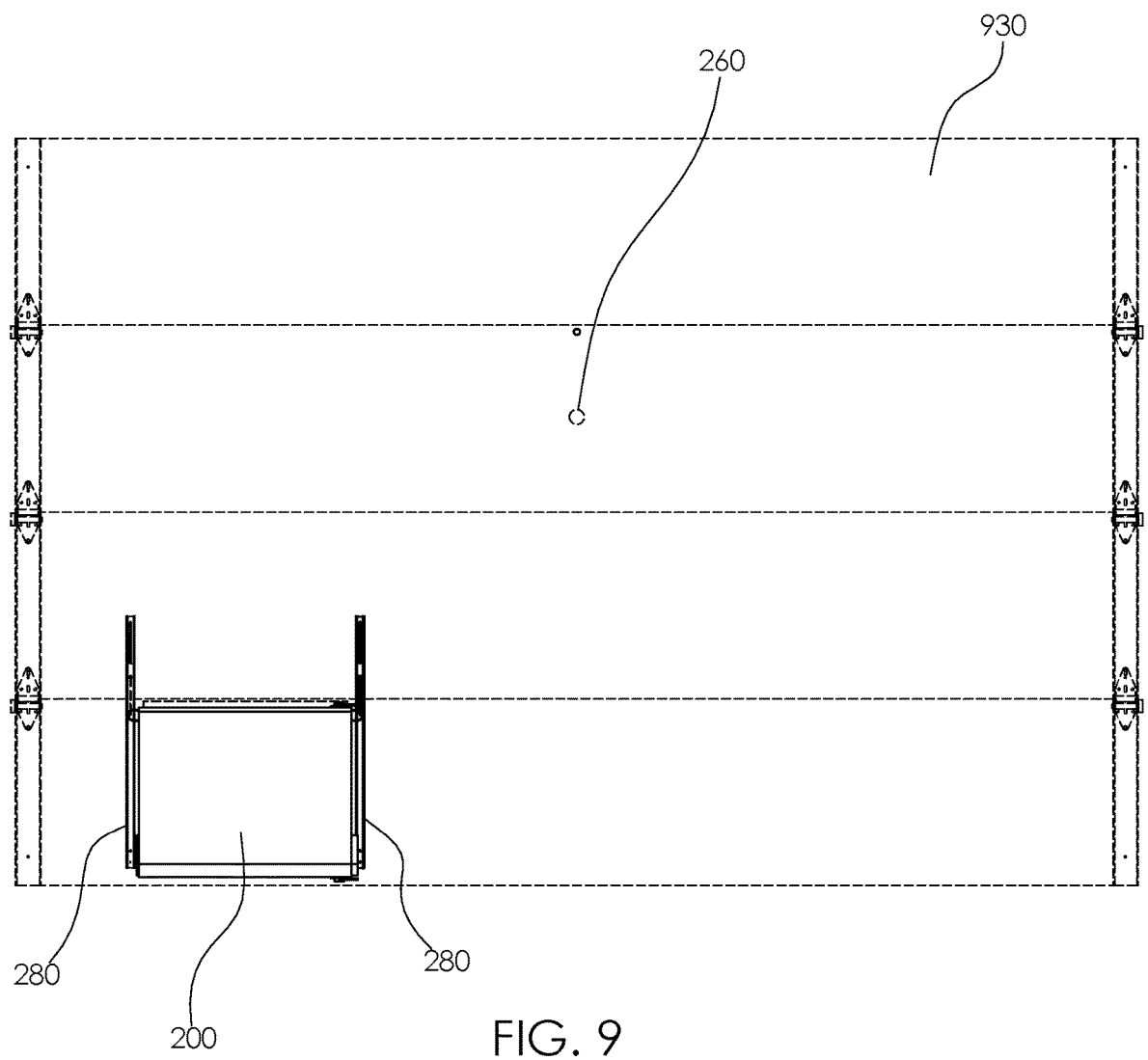
FIG. 9 is a rear view of a second embodiment of the disclosure.
Figure 10:
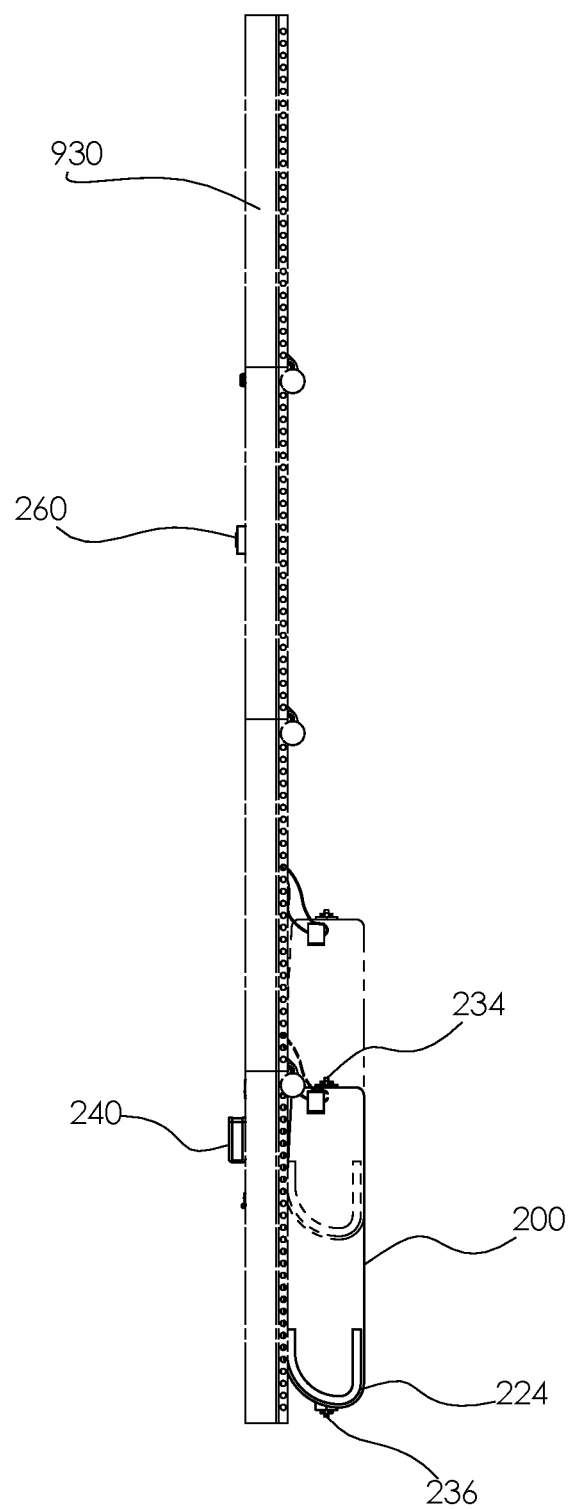
FIG. 10 is a side view of a second embodiment of the disclosure.
Figure 11:
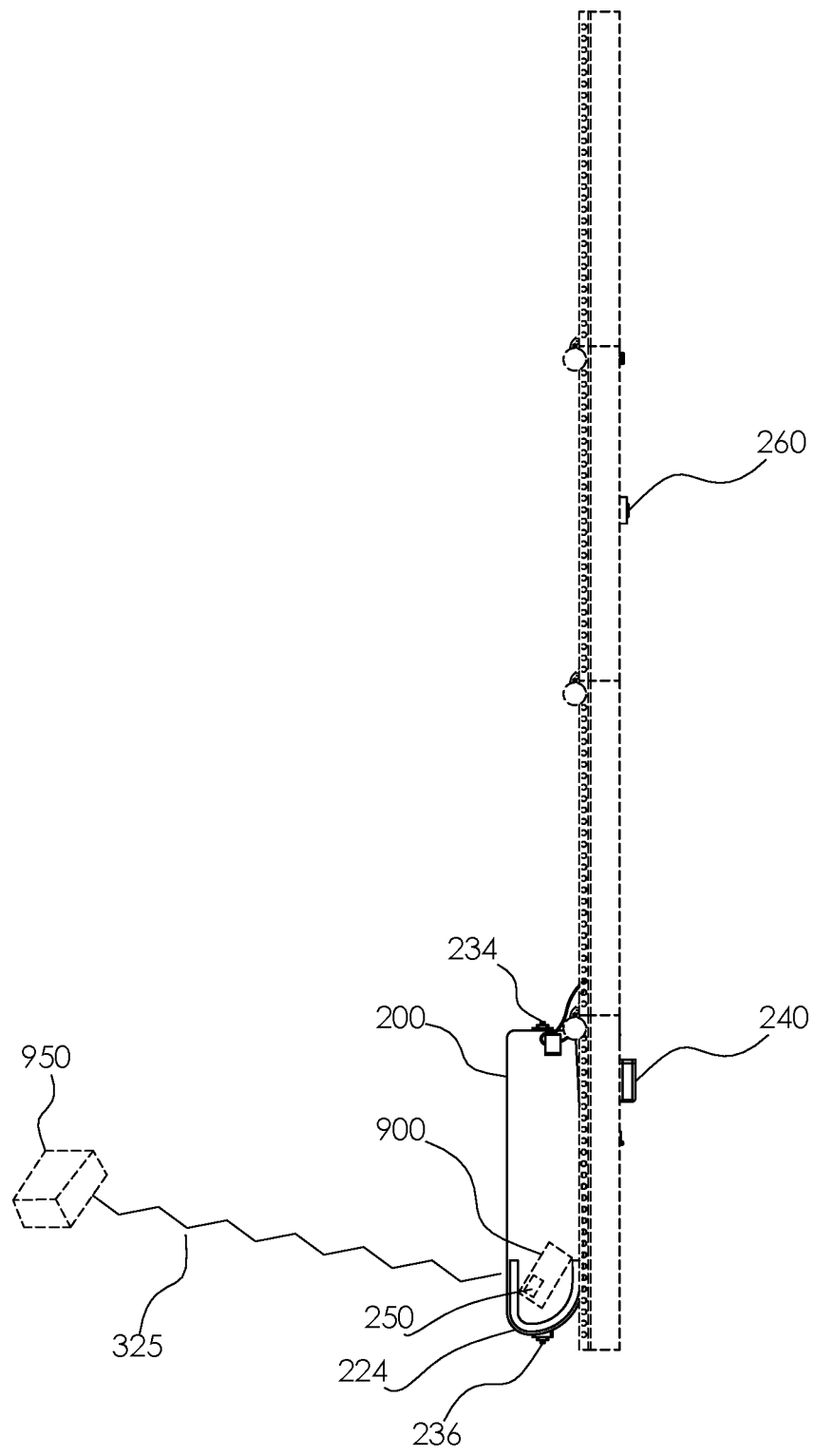
FIG. 11 is a side view of a second embodiment of the disclosure illustrating the receptacle in use.

Detailed reference will now be made to a first potential embodiment of the disclosure, which is illustrated in FIGS. 1 through 11.

The secure parcel delivery receptacle 100 (hereinafter invention) comprises a parcel receptacle 200, a locking cover 220, a scanner 240, and a camera 260. The parcel receptacle 200 may accept a parcel 900 for delivery. Access to the parcel receptacle 200 may be via the locking cover 220 which may be unlocked by the scanner 240. The camera 260 may record one or more images as proof of delivery. The parcel receptacle 200 may be a container into which the parcel 900 may be placed. The parcel receptacle 200 may have an access aperture 205 through which the interior of the parcel receptacle 200 may be accessed from the exterior of the parcel receptacle 200. In embodiments, the parcel receptacle 200 may be a bag or a box.

The locking cover 220 may cover the access aperture 205 to block access to the interior of the parcel receptacle 200. The locking cover 220 may be lockable such that the locking cover 220 will not open unless unlocked by an unlock signal from the scanner 240. The locking cover 220 may automatically relock when the locking cover 220 is closed.

The scanner 240 may scan the parcel 900 to determine parcel identification information from the parcel 900. As a non-limiting example, the parcel identification information may be contained within a shipping label 250 coupled to the parcel 900. The scanner 240 may scan the parcel identification information using wireless technology, optical technology, or a combination thereof. As non-limiting examples, the scanner 240 may scan the parcel identification information by reading an RFID or other NFC information, by optically reading a bar code, by optically reading a QR code, or combinations thereof.

The parcel identification information may comprise or may be associated with a one-time code. The scanner 240 may validate the one-time code by determining that the one-time code is a code that a purchaser and a seller have previously agreed to use to unlock the locking cover 220 and by determining that the one-time code has never previously been used to unlock the locking cover 220. The scanner 240 may apply the unlock signal to the locking cover 220 if the one-time code is so validated. The scanner 240 may withhold the unlock signal if the one-time code is not a previously agreed-upon code or if the one-time code has previously been used to unlock the locking cover 220.

The camera 260 may be adapted to point forward such that a delivery person may be seen by the camera 260. The camera 260 may be activated by a camera signal from the scanner 240 whenever the scanner 240 is activated, whether the locking cover 220 unlocks or not. The camera 260 may record the one or more images while activated. The scanner 240 may deactivate the camera 260 when the locking cover 220 is closed, when the locking cover 220 is relocked, after a pre-determine timeout from the time the camera 260 is activated, or combinations thereof. In some embodiments, the one or more images may form a video clip that shows a moving image. The camera 260 may transfer the one or more images to the scanner 240.

The scanner 240 may communicate with a wireless router 950 via a wireless link 325. The scanner 240 may transmit one or more wireless messages via the wireless link 325. The one or more wireless messages may contain status information regarding attempts to access the invention 100. As a non-limiting example, the one or more wireless messages may take the form of one or more email messages. As non-limiting examples, the one or more wireless messages may include delivery address, date, time, the parcel identification information, success/fail status, duration of time that the locking cover 220 was open and/or unlocked, the one or more images, or combinations thereof. As non-limiting examples, the one or more wireless messages may be sent to the purchaser, to the seller, or to both.

In some embodiments, the invention 100 may be the bag mounted to the interior side of an exterior door 290 with the bag on the interior of a building. The bag may be coupled to guide rails 280 located on the interior side of the exterior door 290 via one or more bag retainers 275. The exterior door 290 may comprise a door aperture 295 that is covered by the locking cover 220 with the locking cover 220 accessible from the exterior of the building. The access aperture 205 of the bag may be aligned with the door aperture 295 such that the parcel 900 may be passed through the door aperture 295 into the bag when the locking cover 220 is unlocked and open. The scanner 240 and the camera 260 may be coupled to the locking cover 220 such both are accessible on the exterior of the building. In some embodiments, the bag may comprise one or more bag return guides 270 to guide the bottom of the bag on the right side, on the left side, or on both sides. The one or more bag return guides 270 may be slidably coupled to one or both of the guide rails 280. The one or more bag return guides 270 may keep the bottom of the bag aligned with the exterior door 290 if the shape of the bag distorts after the parcel 900 is placed inside.

In some embodiments, the invention 100 may comprise a weight sensor 224. The weight sensor 224 may determine a weight of the parcels 900 that are placed into the parcel receptacle 200. The one or more wireless messages sent by the invention 100 to notify of a delivery may contain the weight of the parcels 900 such that the purchaser, the seller, or both may determine whether the weight of the parcels 900 is approximately correct or whether one or more of the parcels 900 may have been scanned and then withheld from delivery.

In some embodiments, the invention 100 may be mounted on the inside of a garage door 930 and may be accessible for deliveries from the outside of the garage door 930. The locking cover 220 and the camera 260 may be located on an individual door panel of the garage door 930 or may be distributed over multiple door panels of the garage door 930.

In some embodiments, a top zipper 234 may close the top of the bag such that the parcels 900 are prevented from falling out of the bag when the garage door 930 is raised and the bag rotates 90 degrees. The top zipper 234 may be opened when the garage door 930 is lowered such that the parcels 900 may be removed through the top of the bag.

In some embodiments, a bottom zipper 236 may close the bottom of the bag such that the parcels 900 are prevented from falling out of the bag. The bottom zipper 236 may be opened to remove the parcels 900 through the bottom of the bag when the garage door 930 is lowered or at least partially raised.

In use, the purchaser may order an item and as part of the ordering process the purchaser and the seller may agree upon the one-time code to use at time of delivery. As non-limiting examples, the one-time code may be specified by the purchaser and sent to the seller as part of the ordering process, may be created by the seller and sent to the purchaser as part of an order confirmation, or a combination thereof. The one-time code may be transmitted to the scanner 240 via the wireless link 325. The one-time code may also be affixed to the parcel 900. As a non-limiting example, the one-time code may appear on a label applied to the parcel 900 within an RFID chip, a barcode, a QR code, or combinations thereof.

When the delivery person delivers the parcel 900, the parcel 900 may be presented to the scanner 240 such that the one-time code may be read by the scanner 240. If the parcel 900 presents the one-time code that was agreed upon, the locking cover 220 may unlock and the delivery person may place the parcel 900 into the parcel receptacle 200. When the locking cover 220 is closed it may relock and the one-time code that was used to open the locking cover 220 may be erased or marked as used so that the one-time code may not be used again.

The scanner 240 may create one or more wireless messages regarding the attempt to unlock the locking cover 220. As a non-limiting example, the one or more wireless messages may be an email that comprises the delivery address, date, time, the parcel identification information, success/fail status, duration of time that the locking cover 220 was open and/or unlocked, or combinations thereof. The email may further comprise one or more images that document the approach of the delivery person and the attempt to unlock the locking cover 220. In some embodiments, the email may further comprise the weight of the parcels 900 that are within the parcel receptacle 200. If the attempt to unlock the locking cover 220 was unsuccessful, meaning that an unknown or previously used one-time code was presented, the one or more wireless messages may be sent to the purchaser only. If the attempt was successful, meaning that a valid and unused one-time code was presented, the one or more wireless messages may be sent to the purchaser and to the seller. The purchaser may eventually remove the parcel 900 from the parcel receptacle 200 by unlocking the locking cover 220 and removing the parcel 900. As non-limiting examples, the locking cover 220 may be unlocked by the purchaser using a message transmitted via the wireless link 325, by scanning an owner barcode or QR code, by using a key to unlock, or combinations thereof. In some embodiments, the purchaser may remove the parcels 900 by opening the top zipper 234 or the bottom zipper 236 of the bag.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used herein, "approximate" and "approximately" indicate that information that is being presented is not critical for proper functioning of the invention and that the information is being provided only to assist in a better understanding of some physical characteristic of an embodiment of the invention. As a non-limiting example, a device that is described as "cubical and approximately 1 inch long on each side" is not required to be precisely 1 inch long on each side and the reader may understand that the device will likely fit in their pocket.

As used in this disclosure, a "bag" may be a container made of a flexible material. The bag has a single opening which allows the bag to receive the items to be contained.

As used in this disclosure, a "camera" may be a sensor that converts light into electric signals that encode the spatial orientation of the captured light in a manner that reproduces the images seen by a human eye.

As used herein, the words "couple", "couples", "coupled" or "coupling", may refer to connecting, either directly or indirectly, and does not necessarily imply a mechanical connection.

As used herein, the words "data" and "information" may be used interchangeably to refer to raw, unprocessed facts and to facts that have been processed, structured, organized, or presented in a context that makes the facts useful.

As used in this disclosure, the word "exterior" may be used as a relational term that implies that an object is not located or contained within the boundary of a structure or a space.

As used in this disclosure, the word "interior" may be used as a relational term that implies that an object is located or contained within the boundary of a structure or a space.

As used in this disclosure, "near field communication" commonly referred to as NFC, is an RFID technology and communication protocol that is commonly implemented on personal data devices.

As used in this disclosure, "RFID" may refer to Radio Frequency IDentification technology. RFID is a wireless technology that uses electromagnetic field to identify and retrieve data from tracking tags that are placed on an object.

As used in this disclosure, a "scale" may refer to a system of ordered markings that are used as a reference for a measurement; the values associated with the ordered markings may be presented visually as indicia along a reference standard or as individual values on a digital readout.

As used in this disclosure, a "sensor" may be a device that quantitatively measures a physical stimulus.

As used in this disclosure, "wireless" may be an adjective that is used to describe a communication channel that does not require the use of physical cabling.

As used in this disclosure, a "zipper" may be a fastening device comprising two flexible strips with interlocking components that are opened and closed by pulling a slide along the two flexible strips.

With respect to the above description, it is to be realized that the optimum dimensional relationship for the various components of the invention described above and in FIGS. 1 through 11, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A secure parcel delivery receptacle comprising:
a parcel receptacle, a locking cover, a scanner, and a camera;
wherein the parcel receptacle accepts a parcel for delivery;
wherein access to the parcel receptacle is via the locking cover which is unlocked by the scanner;
wherein the camera records one or more images as proof of delivery;
wherein the parcel receptacle is a container into which the parcel is placed;
wherein the parcel receptacle has an access aperture through which the interior of the parcel receptacle is accessed from the exterior of the parcel receptacle;
wherein the camera is adapted to point forward such that a delivery person is seen by the camera;

wherein the camera is activated by a camera signal from the scanner whenever the scanner is activated, whether the locking cover unlocks or not;

wherein the camera records the one or more images while activated;

wherein the scanner deactivates the camera when the locking cover is closed, when the locking cover is relocked, after a predetermined timeout from the time the camera is activated, or combinations thereof.

2. The secure parcel delivery receptacle according to claim 1 wherein the parcel receptacle is a bag or a box.

3. The secure parcel delivery receptacle according to claim 2 wherein the locking cover covers the access aperture to block access to the interior of the parcel receptacle;

wherein the locking cover is lockable such that the locking cover will not open unless unlocked by an unlock signal from the scanner;

wherein the locking cover automatically relocks when the locking cover is closed.

4. The secure parcel delivery receptacle according to claim 3 wherein the scanner scans the parcel to determine parcel identification information from the parcel;

wherein the scanner scans the parcel identification information using wireless technology, optical technology, or a combination thereof.

5. The secure parcel delivery receptacle according to claim 4 wherein the scanner scans the parcel identification information by reading an RFID or other NFC information, by optically reading a bar code, by optically reading a QR code, or combinations thereof.

6. The secure parcel delivery receptacle according to claim 4 wherein the parcel identification information comprises or is associated with a one-time code;

wherein the scanner validates the one-time code by determining that the one-time code is a code that a purchaser and a seller have previously agreed to use to unlock the locking cover and by determining that the one-time code has never previously been used to unlock the locking cover;

wherein the scanner applies the unlock signal to the locking cover if the one-time code is so validated;

wherein the scanner withholds the unlock signal if the one-time code is not a previously agreed-upon code or if the one-time code has previously been used to unlock the locking cover.

7. The secure parcel delivery receptacle according to claim 6 wherein the one or more images form a video clip that shows a moving image.

8. The secure parcel delivery receptacle according to claim 6 wherein the camera transfers the one or more images to the scanner.

9. The secure parcel delivery receptacle according to claim 8 wherein the scanner communicates with a wireless router via a wireless link;

wherein the scanner transmits one or more wireless messages via the wireless link;

wherein the one or more wireless messages contain status information regarding attempts to access the secure parcel delivery receptacle.

10. The secure parcel delivery receptacle according to claim 9 wherein the one or more wireless messages take the form of one or more email messages.

11. The secure parcel delivery receptacle according to claim 9 wherein the one or more wireless messages include delivery address, date, time, the parcel identification information, success/fail status, duration of time that the locking cover was open and/or unlocked, the one or more images, or combinations thereof.

12. The secure parcel delivery receptacle according to claim 11 wherein the one or more wireless messages are sent to the purchaser, to the seller, or to both.

13. The secure parcel delivery receptacle according to claim 11 wherein the secure parcel delivery receptacle is the bag mounted to the interior side of an exterior door with the bag on the interior of a building;

wherein the bag is coupled to guide rails located on the interior side of the exterior door via one or more bag retainers;

wherein the exterior door comprises a door aperture that is covered by the locking cover with the locking cover accessible from the exterior of the building;

wherein the access aperture of the bag is aligned with the door aperture such that the parcel is passed through the door aperture into the bag when the locking cover is unlocked and open;

wherein the scanner and the camera are coupled to the locking cover such both are accessible on the exterior of the building.

14. The secure parcel delivery receptacle according to claim 13 wherein the bag comprises one or more bag return guides to guide the bottom of the bag on the right side, on the left side, or on both sides;

wherein the one or more bag return guides are slidably coupled to one or both of the guide rails;

wherein the one or more bag return guides keep the bottom of the bag aligned with the exterior door if the shape of the bag distorts after the parcel is placed inside.

15. The secure parcel delivery receptacle according to claim 13 wherein the secure parcel delivery receptacle comprises a weight sensor;

wherein the weight sensor determines a weight of the parcels that are placed into the parcel receptacle;

wherein the one or more wireless messages sent by the secure parcel delivery receptacle to notify of a delivery contain the weight of the parcels such that the purchaser, the seller, or both determine whether the weight of the parcels is correct or whether one or more of the parcels have been scanned and then withheld from delivery.

* * * * *